United States Patent [19]

Fahim

[11] Patent Number: 5,657,142
[45] Date of Patent: Aug. 12, 1997

[54] OPTIMAL ALLOCATION OF MULTIPLEXING EQUIPMENT AND DISTRIBUTION OF LOAD IN A FIBER OPTIC NETWORK

[75] Inventor: Furrukh Fahim, Dallas, Tex.

[73] Assignee: MCI Communications Corporation, Washington, D.C.

[21] Appl. No.: 506,517

[22] Filed: Jul. 25, 1995

[51] Int. Cl.⁶ .............................. H04B 10/08
[52] U.S. Cl. .................. 359/110; 359/118; 359/165; 370/238; 370/258; 342/827
[58] Field of Search .................... 359/110, 118, 359/125, 137, 164, 165; 370/16.1, 54, 55, 85.13; 340/825.05, 827

[56] References Cited

U.S. PATENT DOCUMENTS

| | | | |
|---|---|---|---|
| 5,128,926 | 7/1992 | Perlman et al. | 370/54 |
| 5,136,581 | 8/1992 | Muehrcke | 370/62 |
| 5,247,381 | 9/1993 | Olmstead et al. | 359/118 |
| 5,430,716 | 7/1995 | Pawelski | 370/54 |
| 5,509,000 | 4/1996 | Oberlander | 370/54 |
| 5,537,392 | 7/1996 | Wille et al. | 370/54 |
| 5,537,394 | 7/1996 | Abe et al. | 370/54 |

*Primary Examiner*—Wellington Chin
*Assistant Examiner*—Rafael Bacares
*Attorney, Agent, or Firm*—Pollock, Vande Sande & Priddy

[57] ABSTRACT

A system and method optimize a fiber optic network arrangement in terms of load balancing and equipment placement at network sites. The present invention accomplishes this optimization by transforming a network of rings into a directed graph of nodes and arcs. The two parameters, which are load balancing and equipment placement, are set up as state variables in a mathematical algorithm for optimization. Following the transformation, descriptive linear equations are derived from the directed graph. The linear equations are then optimized for load distribution and equipment placement at network sites. The present invention may be applied to equipment placement and load distribution in new networks, as well as new load accommodation in existing networks by equating a state variable, corresponding to equipment placement, to a constant value.

12 Claims, 8 Drawing Sheets

| 304 | 306 | 308 | 310 |
|---|---|---|---|
| 1 | A | D | 32 |
| 2 | C | F | 36 |
| 3 | B | D | 18 |
| 4 | E | G | 16 |
| 5 | G | A | 20 |
|   |   |   |   |

FIG. 3

OPTIMAL ALLOCATION OF MULTIPLEXING EQUIPMENT AND DISTRIBUTION OF LOAD IN A FIBER OPTIC NETWORK

FIELD OF THE INVENTION

This invention relates to a communications network and, more particularly, a method and apparatus for optimizing placement of equipment and distribution of load in a fiber optic communications network that uses a multiple-ring configuration.

BACKGROUND OF THE INVENTION

The purpose of a communications network is to transport information among a number of locations served by the network. The information to be transported is usually presented to the network in the form of time-domain electrical signals and may represent any combination of telephony, video, or computer data in a variety of formats. To transport such information, a typical communications network includes various physical sites and information conduits, i.e., links, that interconnect the stations. Each link carries information from one site to another, and each site has a line terminating equipment, which may comprise a multiplexing equipment, and a switching equipment.

The line terminating equipment (LTE) is an interface between a link and a site for transmitting and receiving information. The line terminating equipment transforms the electrical signals into a form of electrical, optical, or radio signals suitable for propagation through the link. Thus, each link has one end connected to a LTE at one site and the other end connected to another LTE located at another site.

Multiplexing (MUX) and demultiplexing (DMUX) equipment may be installed at a site to add or extract information from the network. Multiplexing is the process of combining several low data rate signals into a single high data rate signal for transmission through a communications link. Likewise, demultiplexing refers to the process of decomposing a high data rate signal into several low data rate signals. To transport the information across the network, an input signal is assigned to one or more channels of the multiplexing equipment. The signal is then processed, i.e., digitized, framed, encoded, frequency-justified, etc., and combined with other signals to form a composite signal. Upon reaching an intended destination, the information is extracted from the network by the inverse process of multiplexing, i.e., demultiplexing. In hierarchical multiplexing schemes, the MUX/DMUX equipment may partially demultiplex a received high data rate signal into several intermediate data rate signals for recombining with other signals prior to retransmission.

Switching equipment installed at a site redirects information signals onto selected outgoing links. The switching equipment installed at numerous sites within a network dynamically routes information through the network and, in effect, logically reconfigures the network.

Typically, network information is transported via links, such as electrical cables, microwave guides, and optical fiber conduits. Modulated light carried over fiber optic conduits offers several technical and economic advantages over other types of network links. The principal technical advantage is extremely high modulation bandwidth due to the high carrier frequency. Additional technical benefits are low signal attenuation and distortion, stable path characteristics, and immunity to induced signals. From the economic perspective, fiber optic network systems are more advantageous due to lower cost of manufacture and maintenance.

Synchronous Optical NETwork (SONET) is a standard than now dominates optical signal protocols, as well as network equipment and configurations. The SONET standard primarily specifies signal protocols and data rates to allow diverse equipment types to interoperate within the same network.

Despite the above advantages, however, some elements of fiber optic networks are expensive due to the technology in the line terminating equipment and the multiplexing equipment. The technology involved in implementing multi-gigabit-per-second paths inherently demands costliness in a line terminating equipment due to required precision of specialized equipment, production yields, development costs, etc. In terms of equipment placement, a line terminating equipment Add-Drop Multiplexer (ADM) allows for less costly implementations than another type of line terminating equipment Optical Line Terminating Multiplexer (OLTM) because an ADM may selectively add and drop portions of a passing multiplexed signal. Still, ADM equipment costs are not negligible. The placement of one or more ADMs at a site within a ring network is a design parameter of great importance as it affects network costs and limits flexibility to accomplish load balancing and new demand accommodation. Efficient placement of the equipment and distribution of load are, therefore, the two critical considerations in fiber optic networks.

Currently, a few software packages provide computer aided assessment of proposed physical layer designs and proposed routing of circuit demands. These include the SONET TOOLKIT by Bell Communications Research and the NetMate Fiber Center Planner by Northern Telecom. The software packages, assessing user-proposed layouts and routings, require user interaction to arrive at suitable network solutions. Furthermore, these packages do not provide for load balancing and equipment placement as two state variables upon which optimization is performed.

A need, therefore, exists for an apparatus and method of optimizing network arrangement in terms of load balancing and placement of equipment at network sites.

OBJECTS OF THE INVENTION

It is therefore an object of the invention to optimize network arrangement in terms of load balancing and placement of equipment at network sites.

It is another object of the invention to automatically determine the most cost effective placement of equipment and load balancing within a network based on a predetermined ring configuration for the network and quantified demand for communications volume among network sites.

It is yet another object of the invention to allocate network capacity for optimum accommodation of numerous superimposed communications demands from various sites in the existing network.

It is still another object of the invention to determine, based on quantified demand for communications volume, the most cost effective placement of equipment at future network sites for expanding the existing network.

SUMMARY OF THE INVENTION

These and other objects, features and advantages are accomplished by the present invention.

According to one embodiment of the invention, a system provides for optimum placement of line terminating equipment and distribution of information load in a fiber optic communications network. The system comprises a plurality of sites for processing information load across the network, wherein the plurality of sites form at least one ring configuration. At least one link is located between two adjacent sites on the ring for transporting the information load between two adjacent sites.

Further in accordance with this embodiment of the invention, characteristic information on the ring and the sites is collected as an input for further processing as described below. The characteristic information includes how many sites there are in the network and how many links there are between connecting sites. As another input information, a demand request is also collected which may include a table for indicating communications capacity desired to be supported between the sites.

Still in accordance with this embodiment of the invention, the ring is transformed into a graph which represents each site as at least one model node. The model nodes generated for each site are connected by arcs within the same site and with nodes of other sites. The model nodes and arcs are based on the input of characteristic and demand information.

Further in accordance with this embodiment of the invention, a set of equations are generated which are based on the model node transformation. The equations include the overall network cost which comprises a flow cost term and an equipment cost term, and constraints on flow of the information load.

Finally according to this embodiment of the invention, the equations are optimized to find solutions which may indicate a site within the plurality of sites for placing line terminating equipment and processing volume of said information load for optimum utilization of the network.

BRIEF DESCRIPTION OF THE DRAWINGS

The invention, as well as a preferred mode of use, further objectives and advantages thereof, will best be understood by reference to the following detailed description of an illustrative embodiment when read in conjunction with the accompanying drawings, wherein:

FIG. 3 shows a table of demand for the network of FIG. 2 as one embodiment of the present invention.

In all Figures, like reference numerals represent same or identical components of the present invention.

DESCRIPTION OF THE PREFERRED EMBODIMENTS

In the field of operations research, and specifically network programming, terms such as "demand", "supply", and "commodity" have clearly defined, commonly understood meanings.

In the discussion that follows, the term "demand" is used to refer to a quantified volume of bandwidth requested to transfer information among specific sites within a network. One of the inputs to the optimization process of the present invention is a list of communications "demand" requested of the network. In the mathematical model representing the network, the term "commodity" is used in an analogous fashion to represent the quantifiable entity that flows along directed arcs within the model according to the present invention.

Figure 1:
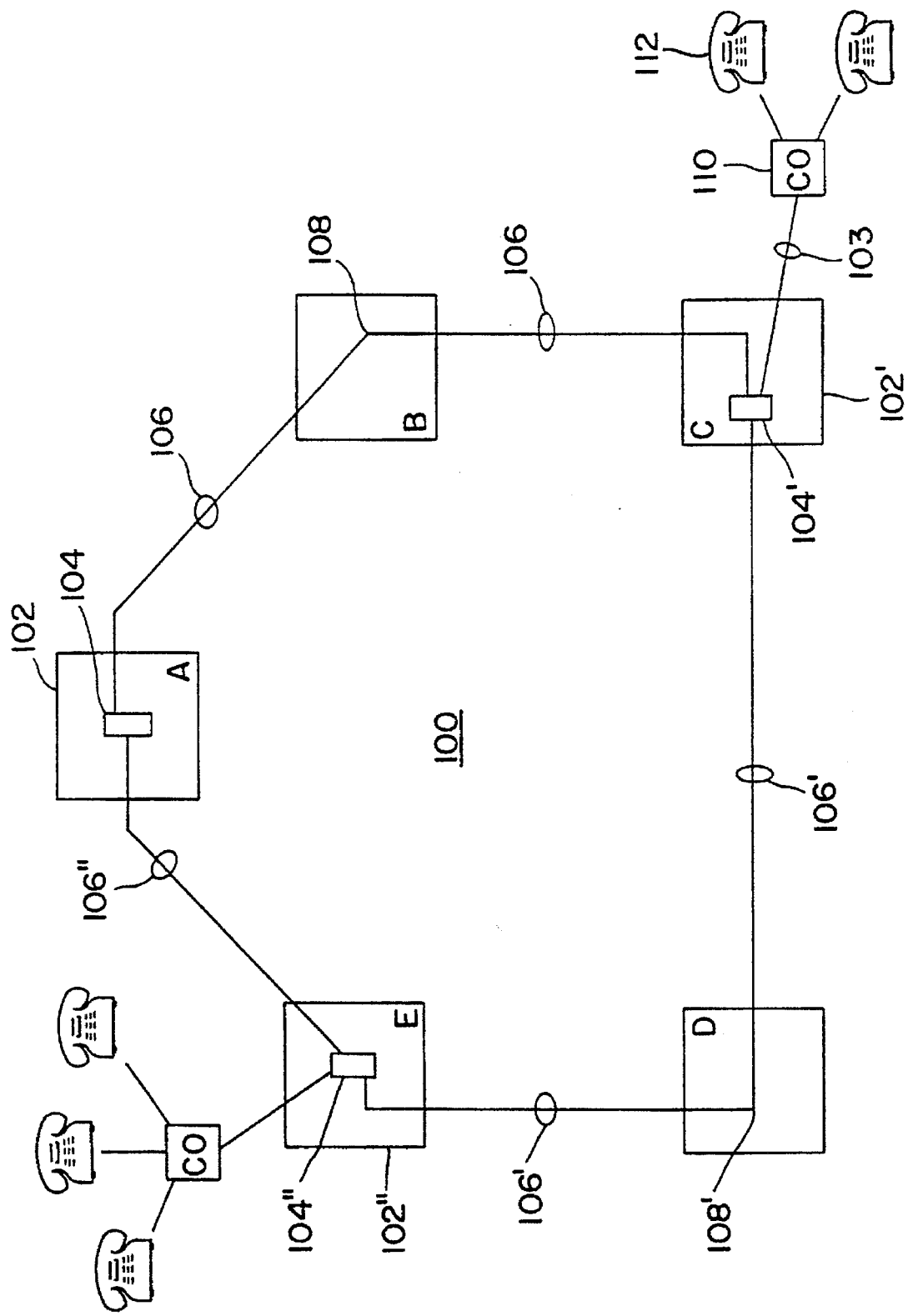
FIG. 1 illustrates a single ring communications network comprising several sites and Add-Drop Multiplexers.

Referring now to the figures, and in particular to FIG. 1, an illustrative network 100 is shown comprising sites 102, 102' and 102" interconnected by spans. The network 100 has three spans: A–C 106, C–E 106' and E–A 106", and each of the spans comprises at least one link. The span 106 between a site A 102 and a site C 102' passes through a site B 108 without being modified or switched. The site B 108 is, therefore, referred to as a "passthrough" site. A site D 108' is another "passthrough" site in the network 100. In practice, there may be a fiber splice, connector, or even a regenerative repeater at this point, but the sites B 108 and D 108' are not a source, destination or branching point for any signals in the links 106 and 106'.

The sites A 102, C 102' and E 102" of FIG. 1 include Add-Drop Multiplexers (ADM) 104, 104' and 104", respectively. The ADM's 104, 104' and 104" at sites A 102, C 102', and E 102" are points of ingress and egress for information transported by the network 100. In applying such network 100 to telephony, for example, the ADM 104' might be connected to a telephone central office 110 that serves telephone subscribers 112 in the vicinity of the site C 102'. The ADM 104' serves as a point where the tributary data stream 103 from the central office 110 feeds into the high data rate communications taking place within the network 100.

Figure 2A:
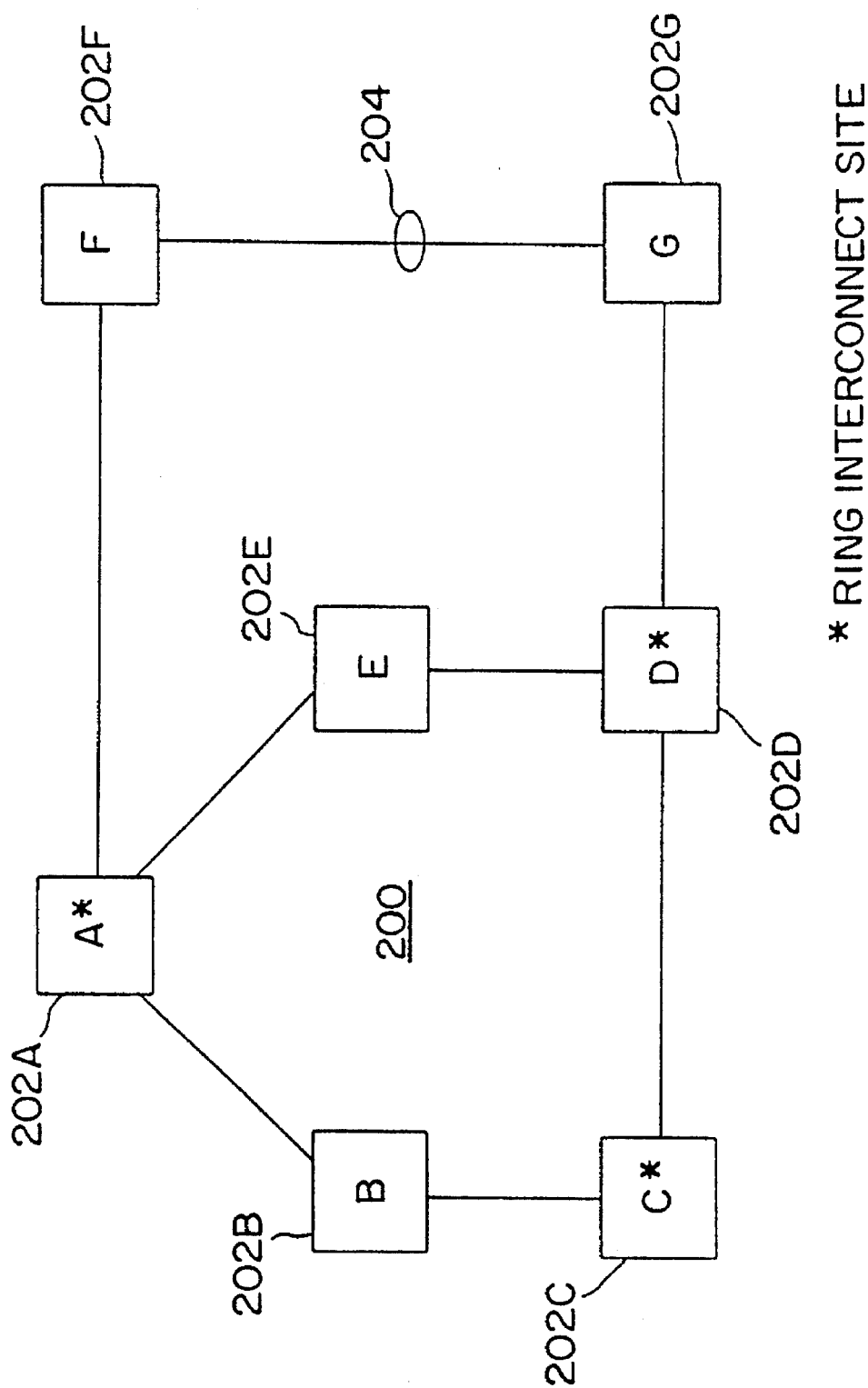
FIG. 2A illustrates a multiple ring network as one embodiment of the present invention.

FIG. 2A shows a network 200, in accordance with one embodiment of the present invention, comprising seven sites A–F denoted as 202A–202G, respectively. Multiple spans, as shown by a representative span 204, join sites 202A through 202G in the network 200. Each span is depicted by a single line in this example, although any of the spare may comprise at least one link. Sites 202A, 202C, and 202D are designated with a "*" to indicate that they are sites at which equipment exists to allow interconnection of rings or crossover of information from one ring to another ring. This aspect of the network 200, i.e., the interconnection equipment for crossover of information from one ring to another, serves as input information to transformation processing, as will be more clearly understood from the description below.

Figure 2B:
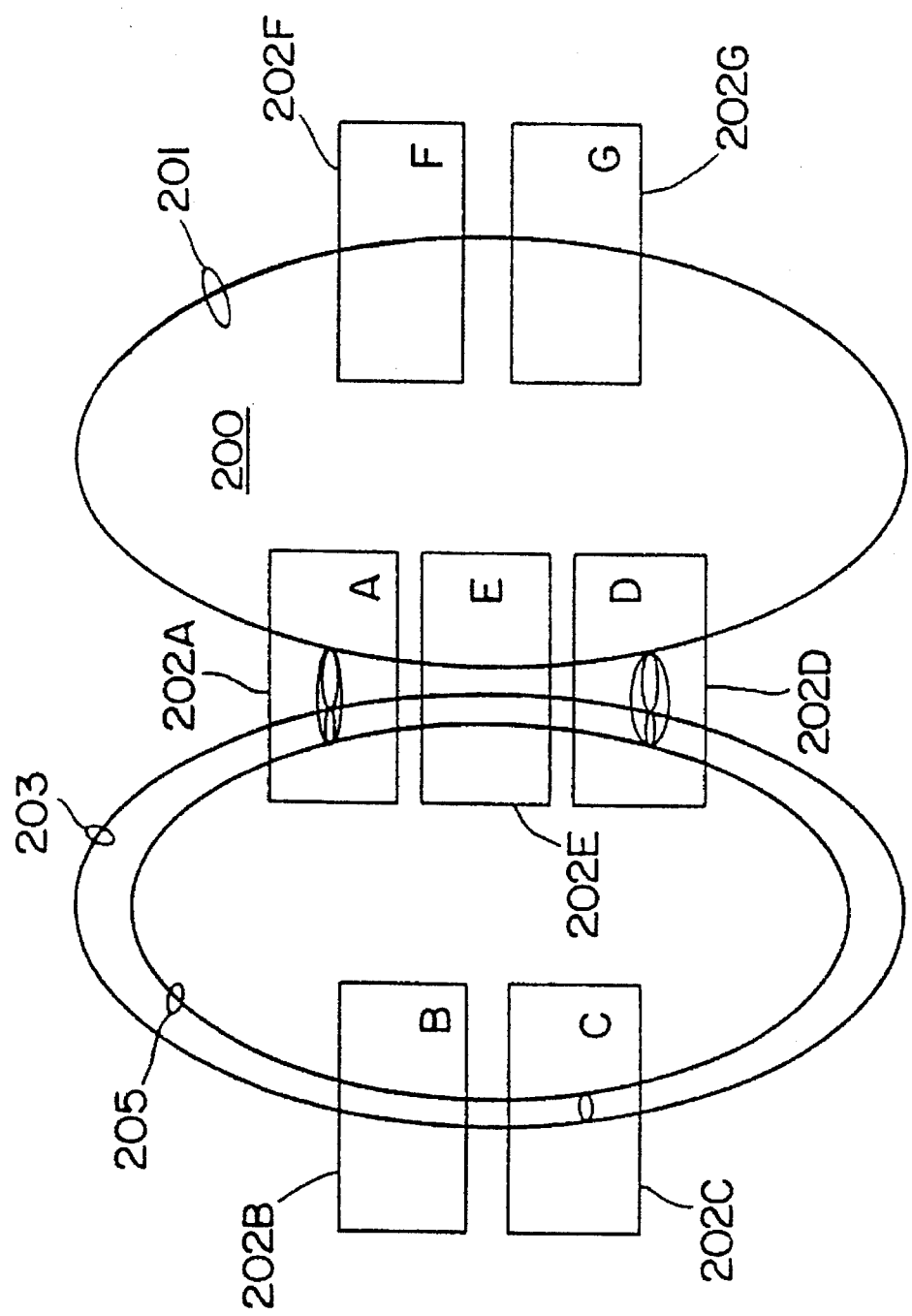
FIG. 2B illustrates rings in the multiple ring network of FIG. 2A.

Another input information to the transformation processing in accordance with the present invention is the ring configuration of the network 200. FIG. 2B is an additional drawing of the network 200 identifying the ring configurations for the present illustrative example. The network 200 includes three rings 201, 203 and 205: two rings 203 and 205 traversing sites A-B-C-D-E-A, and one ring 201 along A-E-D-G-F-A. In the network 200, all three rings 201, 203 and 205 are implemented as two-fiber bi-directional line-switched rings. Note that FIG. 2B also denotes the ring interconnection equipment at sites 202A, 202C, and 202D.

Yet another input information in accordance with the present invention is the requirements for communications volume that the network 200 is expected to provide among sites 202A through 202G. FIG. 3 is, therefore, introduced to show a demand table 300 applicable to the network 200 for illustrative purposes only. The demand table 300 exemplifies a suitable format for expressing demand as an input to the process in accordance with the present invention. For each demand entry 302 illustrated as a row in the demand table 300, there exists an index 304 for the entry that also may be used as a commodity identifier in the mathematical model during processing. Each entry 302 also includes a source or supply site identifier 306, a destination or demand site identifier 308, and a demand quantity 310. For example, the top-most entry in the demand table 300 indicates that in the network 200, 32 units of communication capacity (DS3's, for example) are needed to be transported from the site A to the site D.

Figure 4:
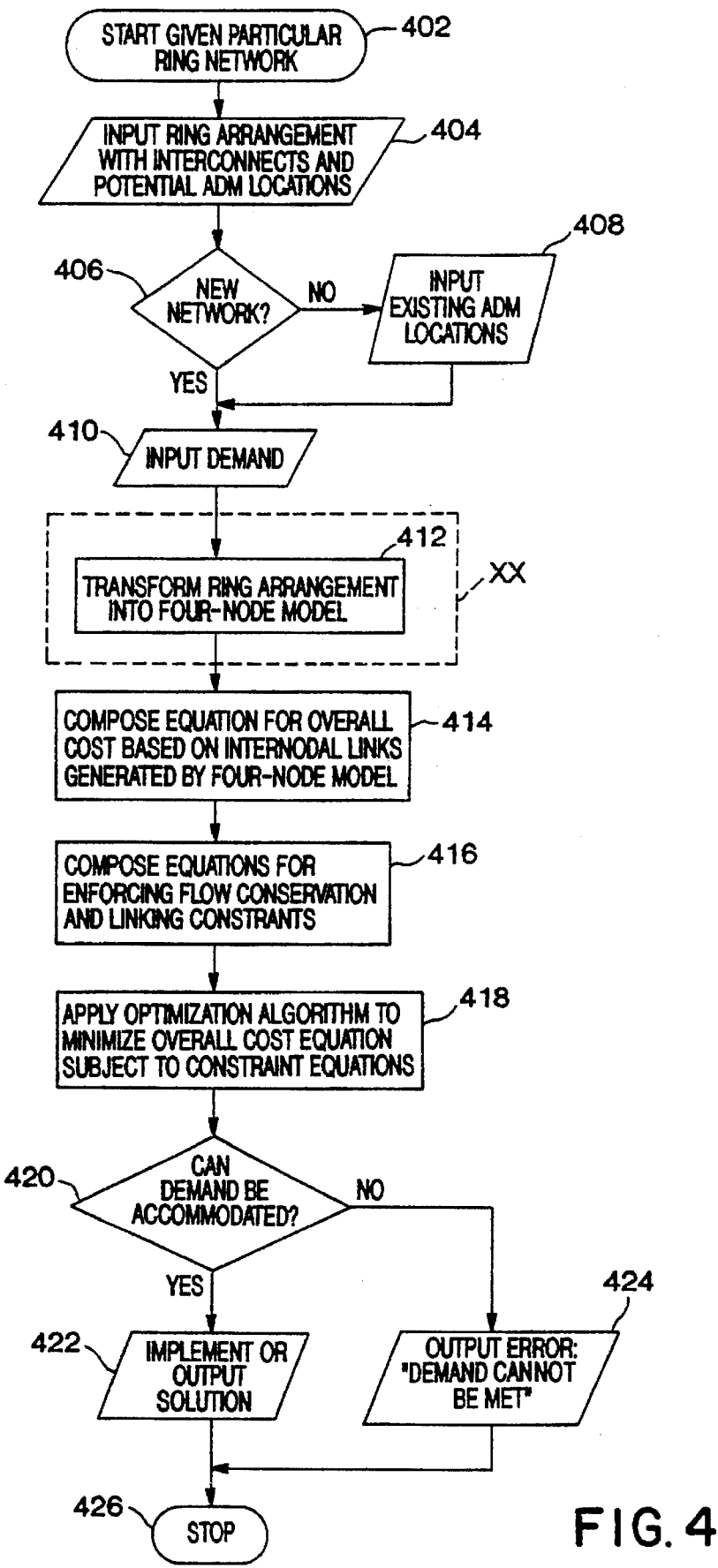
FIG. 4 is a flowchart showing the steps performed in analyzing a network model for optimum equipment placement and load distribution in accordance with the present invention.

In the accompanying drawings, FIG. 4 is a flowchart depicting the logical steps for modeling and analyzing a network in accordance with a preferred embodiment of the present invention. In particular, step 402 refers to the start of a process by which a given network is targeted as the processing context during the subsequent steps. In step 404, processing means accepts input on the physical arrangement of the network, i.e., what sites exist, what sites are joined by spans, how many links in each span, which sites are candidates to have ADM's installed, which sites are equipped to allow for interconnection among rings, and so forth. In step 406, means are used for establishing whether the process is being applied to a new network or an existing network. Step 408 includes means for collecting further input about existing equipment placement if in step 406 application of the process to an existing network is indicated. The processing in step 410 accepts input about what demands are present or, in other words, what communication capacity is required between each site. In one preferred embodiment, this information takes the form of a demand table, such as the demand table 300, with each entry specifying a source site, a destination site, and a quantity of demand expressed, for example, in units of DS3 capacity. In a further preferred embodiment in applying the present invention to an existing network, such a demand table may represent a new overall demand scenario by simply adding previously implemented demand to the desired additional demand.

Step 412, also identified as XX, of FIG. 4 shows the commencement of the modeling transformation based upon the input from the previous steps. This transformation of the physical ring information into a useful intermediate model proceeds according to the logical steps, identified as XX, of FIG. 5 described in detail below. The resulting model is a directed graph conveniently referred to herein as the "four-node model" based upon the four distinct types of functional nodes that are used.

Figure 5:
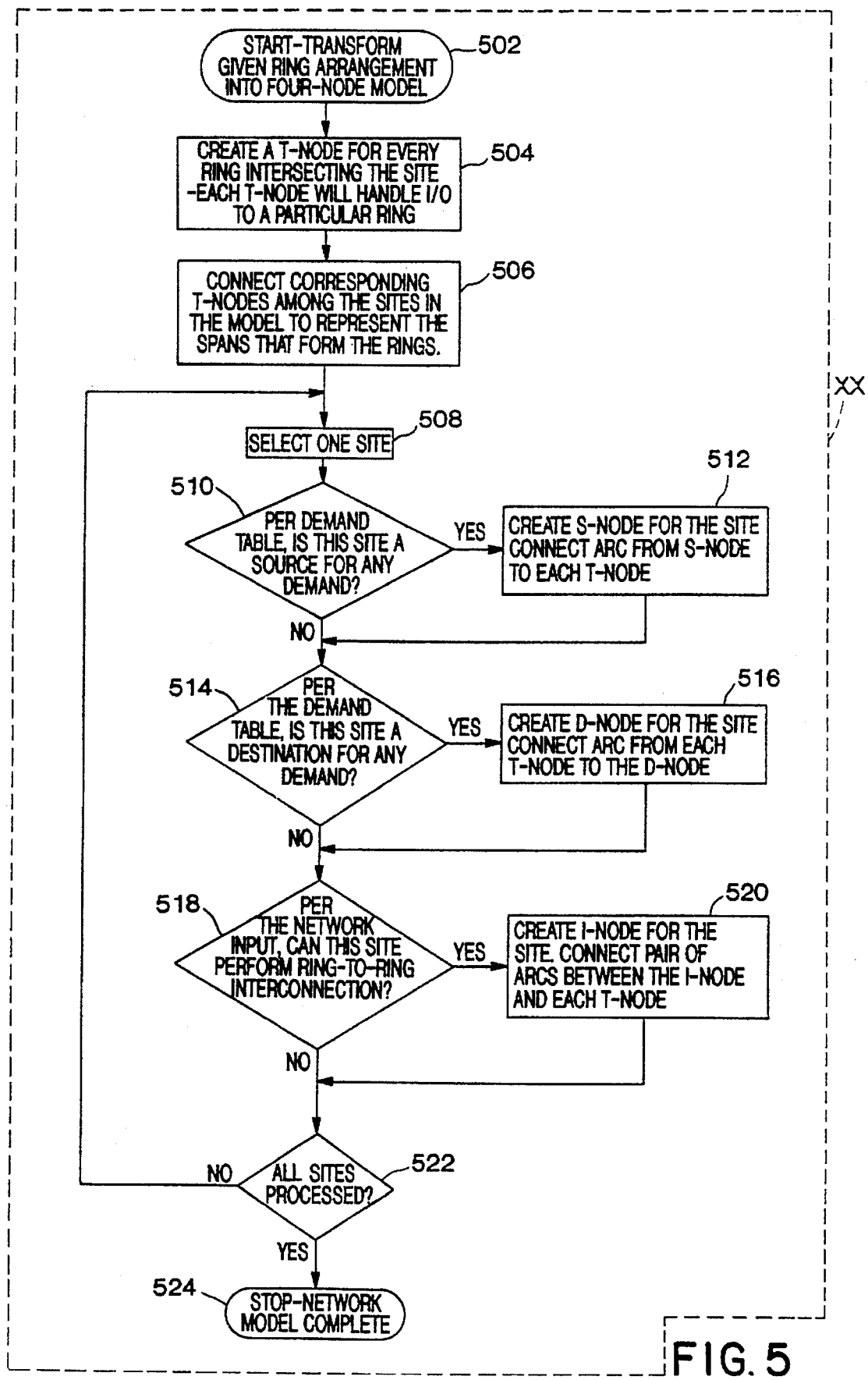
FIG. 5 is a flowchart of the transformation of a given set of rings and interconnect equipment inputs in accordance with the present invention.

Referring now to FIG. 5 for better understanding of the present invention, FIG. 5 illustrates detailed steps for transforming a particular ring configuration into a four node model, according to step 412 of FIG. 4. Thus, step 502 shows the beginning of the transformation summarized in step 412. Step 502 also signifies the identification of a particular network that is to be transformed and that the ring arrangements and interconnect allowances mentioned in subsequent steps are those associated with such network.

Figure 6:
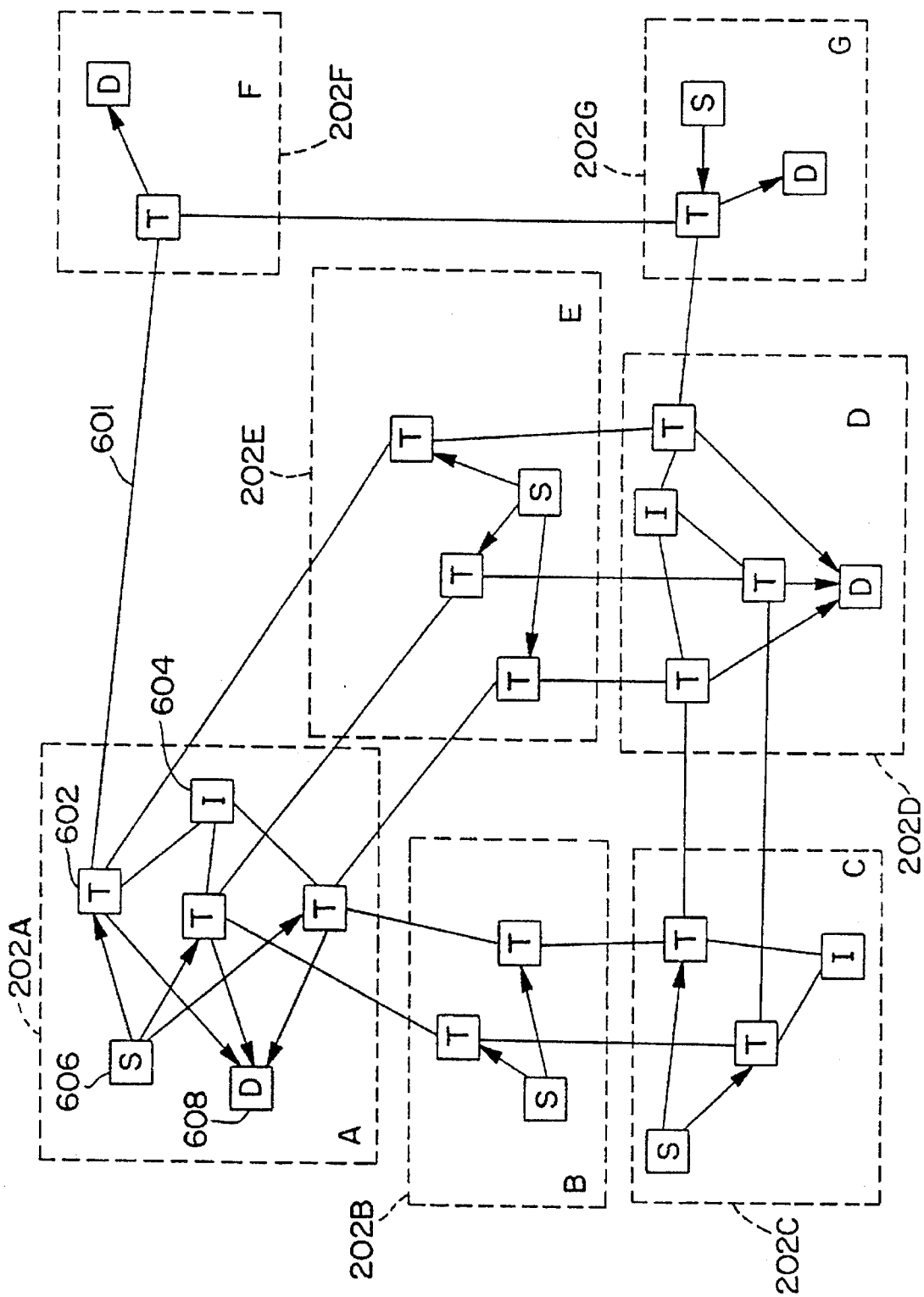
FIG. 6 illustrates a model version of the network of FIG. 2 after the transformation process.
Figure 7:
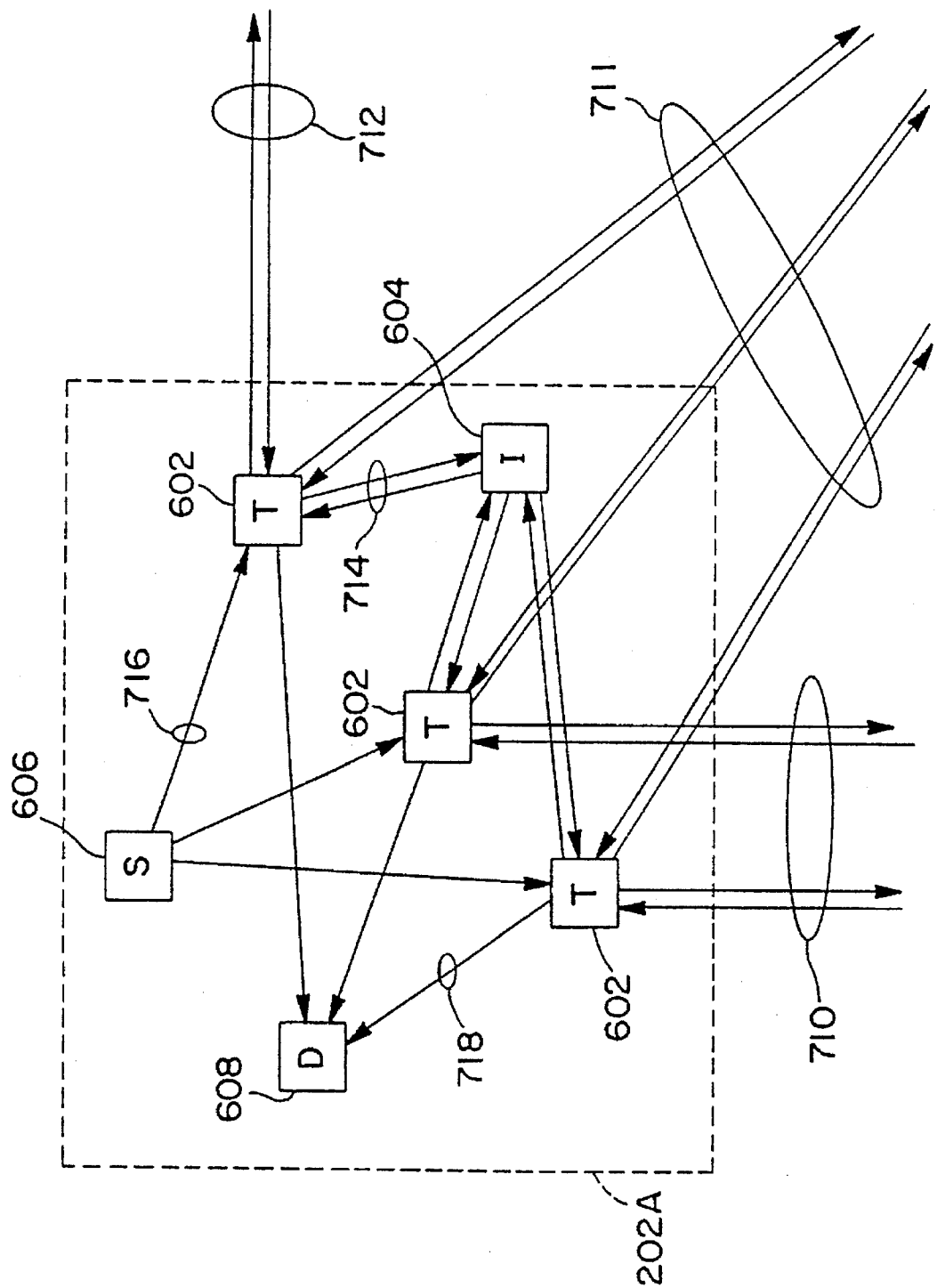
FIG. 7 illustrates a model version of one site from the network of FIG. 2 after the transformation process.

FIGS. 6 and 7 are provided to augment the present discussion. FIG. 6 shows the result of applying the transformation according to FIG. 5 to the network of FIG. 2. Certain pairs of directed arcs are represented as non-directed edges for simplicity. Thus, for example, a pair of directed arcs in span 712 of FIG. 7 are shown as a non-directed edge 601 in FIG. 6. FIG. 7 further shows the result of applying the transformation of FIG. 5 to the network of FIG. 2, emphasizing site 202A in detail.

Now considering FIG. 5 in conjunction with FIGS. 6 and 7, step 504 shows the creation of T-nodes for each site in the model. There is one T-node for each ring in which the given site is a participant. Thus, site A 202 of FIGS. 2A and 2B participates in three rings: two A-B-C-D-E-A rings 203 and 205, and one A-E-D-G-F-A ring 201. Therefore, the view of the equivalent model in FIG. 6 shows three T-nodes 602 within site A 202 in the model.

In step 506, the created T-nodes are interconnected among all the sites representing the logical spans that form the rings. As previously indicated, each of these spans may actually require more than one arc if the ring is implemented, for example, as a bi-directional fiber path.

The logical steps of 510 through 520 are repeated for every site in the network 200. Therefore, step 508 shows the beginning of a loop to process all sites. A different, as yet unprocessed, site is identified by each execution of step 508 until all sites have been processed.

In step 510, the demand table input in step 410 of FIG. 4 is scanned to determine if the selected site is the source of any commodity listed in the table. In particular, the second column of table 300 is examined to determine whether the selected site serves as a source site within the network 200. If so, then step 512 is performed to add an S-node to the given site and to form directed arcs from the S-node to each of the T-nodes in the site. Referring to FIG. 6, S-node 606 is connected to each of the T-nodes in model site A because the demand entry 302 in the table 300 of FIG. 3 names site A as a commodity source.

Operations in steps 514 and 516 are similar to steps 510 and 512. Thus, in step 514, the demand table 300 of FIG. 3 is examined to determine if the selected site is the destination, or point of demand, for any listed commodity. In particular, the third column of table 300 is examined to determine whether the selected site serves as a demand sir within the network 200. If so, then step 516 is performed to add a D-node to the given site and to form directed arcs from each T-node to the D-node. In FIG. 6, D-node 608 is connected to each of the T-nodes in model site A due to the fifth entry in the table 300 of FIG. 3 that shows site A as a commodity demand point.

Finally in FIG. 5, steps 518 and 520, analogous to steps 510–512 and 514–516, provide for creation and connection of an I-node. Thus, in step 518 an input from step 404 of FIG. 4 is examined pertaining to sites having ring interconnection facilities. If in step 518 a given site is found which contains interconnection facilities, then operation in step 520 proceeds to create an I-node at the site and to connect complementary pairs of directed arcs between the I-node and all associated T-nodes, as shown by I-node 604 in FIG. 6. These pairs of arcs represent bi-directional connections.

When the steps 510–520 have been executed for all sites in the model, as determined in step 522, the modeling routine is complete in reaching step 524.

FIG. 6 depicts a complete model as derived by the transformation of the network of FIG. 2 in accordance with the present invention, and has already been referenced in preceding discussion, FIG. 7 depicts a portion of the complete model, and in particular site 202A. Referring to FIG. 7, three T-nodes 602 correspond to the three rings 201, 203 and 205 that pass through site 202A. As previously described, the I-node 604 is connected with each T-node 602 via a pair of directed arcs 714. The directed arcs 714 may be complementary in direction. The S-node 606 is present at site 202A because demand table 300 applicable to the network 200 indicates that site 202A is a source for some commodities. The S-node 606 is connected to each of the T-nodes 602 by a single directed arc 716. Likewise, the D-node 608 is connected by a single directed arc 718 with each of the T-nodes 602. Pairs of arcs forming the network rings 201, 203 and 205 are partially shown emanating from the T-nodes 602 to connect to adjacent sites. Specifically, arcs 710 represent bi-directional ring connections bound for site 202B, arcs 711 go to site 202E, and arcs 712 go to site 202F. These connections are evident in FIG. 6 as well. However, FIG. 7 is shown on sufficient scale to depict the complementary pairs of directed arcs in the mathematical model corresponding to each non-directed edge in FIG. 6.

Continuing with the description of FIG. 4, steps 414, 416, and 418 collectively act upon the output obtained in step 412 to compose and solve a mathematical problem for which solution approaches are well known.

In the mathematical model, "commodity" equates to "demand" for a volume of communications flow as specified by the input in step 410. This may be expressed in units of DS3's, for example, or other convenient rate-of-flow units appropriate to communications as well known by a person skilled in the art. In accordance with the present invention, two types of decision variables are used in formulating the optimization problem. One type is a non-negative integer value representing a flow quantity of each commodity along each directed arc. The other type is a binary value representing the presence or absence of an equipment at a candidate location, assuming a value of one or zero, respectively. These types of variables are expressed as:

$$x_{ij}^k = \text{flow on arc } (i,j); \text{ [range: non-negative integers]} \quad (1)$$

$$y_f = \text{presence of equipment at a location f; [range: binary values \{0,1\}]}, \quad (2)$$

where:
- k=commodity identifier
- i, j=node indices for nodes in a directed graph
- f=index for equipment location site In a preferred embodiment, the optimization of these variables is posed as an integer programming problem, which is similar to a linear programming problem except that the variables to be optimized have integer values rather than being continuous. Linear programming is well known among those skilled in operations research or similar fields of applied mathematics and is adequately described in such texts as "Mathematics with Applications" by M. L. Lial and C. D. Miller, 4th ed., published by Scott, Foresman, and Co. A popular solution technique for linear programs is the widely known simplex method. Integer programming shares similar purpose and notation with linear programming but requires somewhat different solution techniques. The "branch-and-bound" approach is one such technique as taught in the book entitled "Mathematical Programming—Applications and Algorithms" by Wayne Winston, PWS-Kent Publishing, 1991. A further common approach is known as the "tabu search heuristic" as summarized by Fred Glover in a 1989 article in Vol. 1, No. 3, of the Operations Research Society of America's Journal on Computing.

To those skilled in integer programming or network programming, a more specific description of the mathematical model used in accordance with the present invention is stated as "a fixed-charge multicommodity flow problem in which fixed charge facilities have a finite capacity". The term "fixed-charge" is well explained in the book by Winston and, in the present context, refers to the one-time cost of installing an ADM at a site. The finite capacity aspect refers to the limited capacity of each ADM. Finally, the term "multicommodity" refers to the superimposed communications requests, as illustrated, for example, by entries in the table 300 of FIG. 3, that are attempting to pass through shared network elements. This is a necessary specifier because some network flow problems have numerous points of supply and demand and the commodity has no identity, i.e., any supply can meet any demand. In the communications model, though, specific supplies are targeted at specific demands. The "multicommodity" term expresses the need to preserve these supply-demand pairing relationships. Such variations involving "multicommodity" flow in networks are described in the book "Algorithms for Network Programming" by J. L. Kennington and R. V. Helgason, and another book entitled "Linear Programming and Network Flows" by M. S. Bazaraa and J. J. Jarvis, both published by John Wiley & Sons.

Expressed in the so-called "standard minimum form", the integer programming problem to be performed in accordance with the present invention is stated as:

$$\min \sum_{k \in K} \sum_{(i,j) \in A \cup B} c_{ij} x_{ij}^k + \sum_{f \in F} h_f y_f \quad (3)$$

such that $$\sum_{j \in N} x_{ij}^k - \sum_{l \in N} x_{li}^k = \begin{cases} b_i^k \text{ if } i = O(k) \\ -b_i^k \text{ if } i = D(k) \\ 0 \text{ otherwise} \end{cases} \forall i \in N \text{ and } k \in K \quad (4)$$

$$\sum_{(i,j) \in A} \sum_{k \in K} x_{ij}^k \leq u_f y_f \forall f \in F \quad (5)$$

$$\sum_{(i,j) \in B} \sum_{k \in K} x_{ij}^k \leq \alpha_{ij} \alpha \in \Gamma$$

$$y_f = 0 \text{ or } 1$$

where:
- A=Set of add and drop arcs
- B=Set of span arcs
- N=Set of nodes
- F=Set of site locations for ADMs
- S=Set of commodities
- $h_f$=Fixed cost of ADM f∈F
- $c_{ij}$=Unit flow cost on (i,j)∈A
- O(k)=Origin of commodity k∈S
- D(k)=Destination of commodity k∈S
- $b^k$=Supply of commodity k∈S
- $u_f$=Capacity of ADM f∈F The so-called "objective equation" (3) represents the overall network cost that is to be minimized and comprises a flow cost term and an equipment cost term. The flow cost term is obtained by summing, for all arcs in the model, the product of the commodity flow along each given arc times a per-unit-commodity cost pertaining to the given arc. The equipment cost term is obtained by summing, for all candidate ADM locations, the product of a binary value representing the presence or absence of an ADM, times the cost of an ADM at the given location.

The constraint equations include a set of flow conservation equations (4) and a set of collective flow constraint equations (5). The flow conservation equations assert that (a) for I and T nodes, sum of commodity flow-in equals sum of commodity flow-out, and that (b) for S and D nodes, sum of commodity flow along all arcs is consistent with the total mount of a given commodity entering or exiting the network, respectively. The collective flow constraint equations actually serve two roles. First, they effectively disallow assignment of commodity to certain arcs in the absence of a associated ADM. Secondly, they represent real-world capacity limitations by limiting the sum of all commodities flowing along any given arc. This latter function is commonly called a "linking" constraint because it addresses the interdependence of the commodities due to capacity-limited network elements.

Steps 414 and 416 produced a set of equations from the model obtained in step 412 in preparation for the optimization step 418. Specifically, step 414 generates an overall cost equation in the form of equation (3) above. The processing in step 416 yields a set of constraint equations in the form of equations (4) and (5) above.

Referring to step 418 of FIG. 4, the equations generated in steps 414 and 416 are submitted to an optimization algorithm. The optimization algorithm may be, for example, a variation of integer programming, in order to find values of the commodity distribution and equipment-presence variables which minimize the result of the cost equation in step 414 while obeying the constraints imposed by equations in step 416. The present invention teaches new and unobvious techniques associated with the model transformation and equation composition techniques described above, whereas the particular optimization algorithm to process the resultant equations is subject to variation without affecting the scope and spirit of the invention. Solution to the optimization algorithm may require no equipment at a site in a given ring. This would simply result in the "passthrough" site 108, as depicted in FIG. 1.

In step 420, the output of the optimization routine is checked for successful execution and for a viable solution. Means for the optimization routine would signal an error indicative of, for example, inability to meet one of the constraint equations with any combination of values for the variables. If such a situation arises, in step 424 an appropriate error indicator is produced as a result of the process, rather than the normal output of values in a solution to the equations. In the event that in step 420, the optimization is determined to have proceeded successfully, then in step 422 output values for the variables are generated which serve as an input to the process in step 418. These values may, for example, be printed or displayed and applied to the network 200, for example, in the following manner.

The y variables that have adopted a binary value of 1 after the optimization are interpreted as locations where an equipment, such as an ADM, should be physically installed in the network 200. For example, if in the network 200, a given T-node 602 is represented as $y_1$ and a binary value of 1 is obtained for $y_1$, then an ADM should be installed at the location represented by the T-node 602.

The x variables, as described in the equation (1), are examined and interpreted to determine the optimum distribution of various commodities along different arcs. This translates to the actual parameters which identify rings bearing the indicated load in the indicated direction. This translation may be best understood with reference to FIG. 7. In the course of modeling the network 200 according to steps 412–416 shown with respect to the site 202A, S-node 606 and T-node 602 had been assigned node identifiers 1 and 2, respectively. Then, variable x in the equations would correspond to the flow of commodity k along arc 716. If the optimization resulted in values of x=3 and x=4, for example, then 3 units of commodity 1 and 4 units of commodity 2 would be routed to the T-node 602. In the network 200, the T-node 602 corresponds to an ADM in a ring at the site 202A. With non-zero values for flow along the arc 716, the existence of this ADM will have been guaranteed as a result of the constraint equation (5) according to the present invention.

In essence, the preceding description may be applied to all arcs emanating from a given S-node to indicate the best distribution of the communications load in terms of DS3's, for example, among the various rings in the network. Furthermore, the output of the optimization step 418 may also be used to determine the best direction for propagation of commodities to achieve optimal load balancing of the network rings. For example, with respect to the T-node 602, the optimized x values indicate the following:

an influx of 3 units of commodity 1 along the arc 716;

an efflux of 2 units of commodity 1 along the outgoing arc of span 712; and an efflux of 1 unit of commodity 1 along the outgoing arc of span 711.

This indicates that 2 units of commodity 1 should be routed along the clockwise direction of the ring, whereas 1 unit should flow in the opposite direction. Moreover, as another advantage of the present invention, the optimization has simultaneously taken into account the variability of ADM placement.

Applied to new network designs, these values indicate where to place equipment and how to route communications traffic within the network. Those skilled in the art will recognize that, by replacing some variables as constants, the present invention may be also applied to the problem of demand distribution in existing networks and to partial flexibility in placing additional ADM's at a few candidate sites in an existing network.

In one preferred embodiment, the apparatus of the present invention comprises the process depicted in FIG. 4 executing on a von Neumann machine such as a microprocessor-based computer workstation. In this embodiment, the network configuration and inputs in accordance with the present invention may be available, for example, in the form of keyboard or mouse input from a user of the workstation. Alternatively, the inputs may exist as files on a disk drive attached as a peripheral storage device to the workstation. Although some representative inputs were mentioned, other devices and forms of input may be used as well known to a person skilled in the art.

The output of the process may take the form of a printout on paper, graphical or textual display on a viewing screen connected to the workstation, or as another file on the disk drive, for example. Similar to the input information discussed above, other devices and forms of output may be used as known to a person skilled in the art.

Yet another embodiment may include that demand input be submitted manually to a process operating within a computer whereupon the results of the analysis, if feasible, are communicated directly from the computer to the subject network and enacted immediately.

Yet another embodiment of the present invention includes providing means within an existing network such that inputs of demand requests are directly sensed by reporting means of the network. The demand requests, for example, may be expressed as a percentage of load balancing. The optimization process will then occur upon the reporting means sensing the actual load balancing within the network and supplying this input information to the optimization processing in accordance with the present invention. The output of the optimization process will provide automatic redistribution of the load balancing, if solutions to the optimization equations are found as disclosed by the present invention.

While the present invention has been particularly shown and described with reference to a preferred embodiment, it will be understood by those skilled in the art that changes in form and detail may be made therein without departing from the spirit and scope of the invention as defined in the appended claims.

Since those skilled in the art can modify the disclosed specific embodiments without departing from the spirit of the invention, it is, therefore, intended that the claims be interpreted to cover such modifications and equivalents.

What is claimed is:

1. A system for optimizing placement of line terminating equipment and distribution of information load in a fiber optic communications network, comprising:

a plurality of sites for processing said information load across said network, wherein said plurality of sites form at least one ring;

at least one link located between two adjacent sites on a ring for transporting said information load between said two sites;

responsive to a configuration of said ring and plurality of sites, characteristic information means for providing characteristic information on said ring and said plurality of sites;

demand information means for providing demand information requested to be supported by said network;

responsive to said characteristic and demand information means, transformation means for transforming said ring into a graph which represents each site as at least one model node, wherein model nodes in said plurality of sites are connected by arcs with model nodes of the same site and model nodes of other sites based on said characteristic and demand information;

responsive to said transformation means, generating means for generating equations based on said transformation, said equations including the overall network cost which comprises a flow cost term and an equipment cost term, and constraints on flow of said information load; and responsive to said generating means, optimizing means for optimizing said equations to find solutions which may indicate a site within said plurality of sites for placing line terminating equipment and processing volume of said information load for optimum utilization of said network.

2. The system according to claim 1, wherein said line terminating equipment comprises a multiplexing equipment.

3. The system according to claim 1, wherein said characteristic information includes a number of sites in said network and a number of links between said sites.

4. The system according to claim 3, wherein said characteristic information means comprise an input device for entering said characteristic information into a computer.

5. The system according to claim 1, wherein said demand information includes a table for indicating communications capacity desired between said sites.

6. The system according to claim 1, wherein said model nodes for each site comprises:

a T-node if said site is located on said ring;

an S-node if said site is a source for said information load in said network;

a D-node if said site is a destination for said information load in said network; and an I-node if said site can connect with other rings in said network, wherein said arcs are directed (a) from said S-node to each T-node, (b) from said each T-node to said D-node, and (c) between said I-node and said each T-node.

7. The system according to claim 1, further comprising indicating means for indicating output results of said optimization.

8. The system according to claim 7, wherein said indicating means comprise a visual display on display means.

9. The system according to claim 1, further comprising sensing means for sensing an actual load balancing in said network and reporting means for reporting said load balancing to a computer which performs said transformation and optimization in said network.

10. A method of optimizing placement of line terminating equipment and distribution of information load in a fiber optic communications network, comprising:

arranging a plurality of sites in a ring for processing said information load across said network;

transporting said information load between two sites via a link located between said two sites on said ring;

responsive to configuration of said ring and plurality of sites, collecting characteristic information on said ring and said plurality of sites;

collecting demand information requested to be supported by said network;

responsive to said collecting of characteristic and demand information, transforming said ring into a graph which represents each site as at least one model node;

connecting arcs among model nodes of the same site and model nodes of other sites based on said characteristic and demand information;

generating equations based on said transformation, said equations including the overall network cost which comprises a flow cost term and an equipment cost term, and constraints on flow of said information load; and optimizing said equations to find solutions which may indicate a site within said plurality of sites for placing line terminating equipment and processing volume of said information load for optimum utilization of said network.

11. The method according to claim 10, wherein said transforming each site comprises:

generating a T-node if said site is located on said ring;

generating an S-node if said site is a source for said information load in said network;

generating a D-node if said site is a destination for said information load in said network; and generating an I-node if said site can connect with other rings in said network.

12. The method according to claim 11, wherein said connecting comprises directing said arcs (a) from said S-node to each T-node, (b) from said each T-node to said D-node, and (c) between said I-node and said each T-node.

* * * * *